(12) United States Patent
Clowes et al.

(10) Patent No.: US 11,047,276 B2
(45) Date of Patent: Jun. 29, 2021

(54) GASOLINE PARTICULATE FILTER

(71) Applicant: JOHNSON MATTHEY PUBLIC LIMITED COMPANY, London (GB)

(72) Inventors: Lucy Clowes, Royston (GB); Michael Anthony Howard, Wayne, PA (US)

(*) Notice: Subject to any disclaimer, the term of this patent is extended or adjusted under 35 U.S.C. 154(b) by 0 days.

(21) Appl. No.: 16/472,264

(22) PCT Filed: Dec. 22, 2017

(86) PCT No.: PCT/GB2017/053878
§ 371 (c)(1),
(2) Date: Jun. 21, 2019

(87) PCT Pub. No.: WO2018/115900
PCT Pub. Date: Jun. 28, 2018

(65) Prior Publication Data
US 2020/0191030 A1 Jun. 18, 2020

(30) Foreign Application Priority Data
Dec. 23, 2016 (GB) .................................. 1622179

(51) Int. Cl.
*F01N 3/10* (2006.01)
*F01N 3/035* (2006.01)
*B01D 53/94* (2006.01)
*F01N 3/022* (2006.01)

(52) U.S. Cl.
CPC ......... *F01N 3/035* (2013.01); *B01D 53/9454* (2013.01); *F01N 3/022* (2013.01); *F01N 3/101* (2013.01); *B01D 2255/1021* (2013.01); *B01D 2255/1023* (2013.01); *B01D 2255/1025* (2013.01); *B01D 2255/9155* (2013.01); *F01N 2510/0684* (2013.01)

(58) Field of Classification Search
CPC ........ F01N 3/2066; F01N 3/101; F01N 3/035; F01N 3/021; F01N 3/022; F01N 3/0222; F01N 2510/0684; B01D 53/9494; B01D 2255/1021; B01D 2255/1023; B01D 2255/1025; B01D 2255/9155
USPC ............................................. 60/299
See application file for complete search history.

(56) References Cited

U.S. PATENT DOCUMENTS

| 8,889,221 | B2* | 11/2014 | Sappok | B01D 39/2093 427/237 |
| 2005/0119117 | A1* | 6/2005 | Yoshida | C01G 25/006 502/302 |
| 2010/0266461 | A1* | 10/2010 | Sappok | B01D 39/2093 422/177 |
| 2013/0243659 | A1* | 9/2013 | Sutton | B01J 29/44 422/168 |
| 2013/0269528 | A1* | 10/2013 | Sappok | F01N 3/0296 95/278 |
| 2014/0356266 | A1* | 12/2014 | Chen | F01N 3/0222 423/212 |
| 2016/0363019 | A1* | 12/2016 | Warner | F01N 3/023 |

* cited by examiner

*Primary Examiner* — Jason D Shanske

(57) ABSTRACT

The present invention provides a particulate filter for use in an emission treatment system of a gasoline engine, the filter having an inlet side and an outlet side, wherein at least the inlet side is loaded with a synthetic ash.

14 Claims, 7 Drawing Sheets

GASOLINE PARTICULATE FILTER

FIELD OF THE INVENTION

The present invention relates to a particulate filter, in particular a particulate filter for use in an emission treatment system of a gasoline engine. The particulate filter provides an advantageous combination of low back pressure and high fresh filtration efficiency.

BACKGROUND OF THE INVENTION

Gasoline engines produce combustion exhaust streams containing hydrocarbons, carbon monoxide, and oxides of nitrogen in conjunction with particulates. It is known to treat the gases with a three-way conversion catalyst composition, and it is known to recover the particulates in particulate traps such as soot filters.

In contrast to particulates generated by diesel lean burning engines, the particulates generated by gasoline engines tend to be finer and at lower levels. This is due to the different combustion conditions of a diesel engine as compared to a gasoline engine. For example, gasoline engines run at a higher temperature than diesel engines. Also, the resultant hydrocarbon components are different in the emissions of gasoline engines as compared to diesel engines.

Original equipment manufacturers (OEMs), i.e. the vehicle manufacturer, require gasoline particulate filters (GPFs) to have high fresh filtration efficiency and low backpressure. However, as there is little engine-out particulate mass from a gasoline engine, no soot cake is generated during the pre-conditioning of the aftertreatment system before testing. This soot cake is responsible at least in part for the high filtration efficiency of diesel particulate filters, and with a diesel engine an effective soot cake can be formed in 10-20 km of driving. As this effect is not generally achievable with a gasoline engine, the target fresh filtration efficiency is met by using a higher washcoat loading and this increases the pressure drop across the part.

This consideration only applies to fresh parts in order to satisfy a requirement for an end-of-line test at the OEM. As the vehicle accumulates mileage the GPF increases its filtration efficiency due to accumulation of ash, a combustion by-product.

Therefore, for most of the life of a GPF it is over-engineered for filtration efficiency and the GPF has a higher pressure drop than it needs to for most of its life, reducing the potential performance characteristics of the engine.

WO 2014162140 (A1) relates to a catalysed filter for filtering particulate matter from exhaust gas comprising one or more catalyst poisons and emitted from a positive ignition internal combustion engine, which filter comprising a porous substrate having a total substrate length and having inlet surfaces and outlet surfaces, wherein the inlet surfaces are separated from the outlet surfaces by a porous structure containing pores of a first mean pore size, wherein the porous substrate is coated with a washcoat comprising a plurality of solid particles, wherein the porous structure of the washcoated porous substrate contains pores of a second mean pore size, wherein the second mean pore size is less than the first mean pore size, which washcoat being axially arranged on the porous substrate as a first zone comprising the inlet surfaces of a first substrate length less than the total substrate length and a second zone comprising the outlet surfaces of a second substrate length less than the total substrate length, wherein the sum of the substrate length in the first zone and the substrate length in the second zone>100%, wherein the washcoat of at least the second zone is a three-way catalyst washcoat comprising one or more precious metal supported on a high surface area oxide, and an oxygen storage component and wherein: (i) a specific surface area of washcoat in the first zone>second zone; or (ii) both a washcoat loading and a specific surface area of washcoat in the first zone>second zone.

It is desirable to provide an improved particulate filter and/or tackle at least some of the problems associated with the prior art or, at least, to provide a commercially useful alternative thereto.

SUMMARY OF THE INVENTION

According to a first aspect there is provided a particulate filter for use in an emission treatment system of a gasoline engine, the filter having an inlet side and an outlet side, wherein at least the inlet side is loaded with a synthetic ash.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The particulate filter is typically formed of a porous substrate. The porous substrate may comprise a ceramic material such as, for example, cordierite, silicon carbide, silicon nitride, zirconia, mullite, spodumene, alumina-silica-magnesia, zirconium silicate, and/or aluminium titanate, typically cordierite or silicon carbide. The porous substrate may be a porous substrate of the type typically used in emission treatment systems of gasoline engines.

The porous substrate may exhibit a conventional honeycomb structure. The filter may take the form of a conventional "through-flow filter". Alternatively, the filter may take the form of a conventional "wall flow filter" (WFF). Such filters are known in the art.

The particulate filter is preferably a wall-flow filter. Wall-flow filters work by forcing a flow of exhaust gases (including particulate matter) to pass through walls formed of a porous material.

A wall flow filter typically has a first face and a second face defining a longitudinal direction therebetween. In use, one of the first face and the second face will be the inlet face for exhaust gases and the other will be the outlet face for the treated exhaust gases. A conventional wall flow filter has first and second pluralities of channels extending in the longitudinal direction. The first plurality of channels is open at the first face and closed at the second face. The second plurality of channels is open at the second face and closed at the first face. The channels are preferably parallel to each other to provide a constant wall thickness between the channels. As a result, gases entering one of the plurality of channels cannot leave the monolith without diffusing through the channel walls into the other plurality of channels. The channels are closed with the introduction of a sealant material into the open end of a channel. Preferably the number of channels in the first plurality is equal to the number of channels in the second plurality, and each plurality is evenly distributed throughout the monolith. Preferably, within a plane orthogonal to the longitudinal direction, the wall flow filter has from 100 to 500 channels per square inch, preferably from 200 to 400. For example, on the first face, the density of open first channels and closed second channels is from 200 to 400 channels per square inch. The channels can have cross sections that are rectangular, square, circular, oval, triangular, hexagonal, or other polygonal shapes.

The materials that make up the synthetic ash are typically not inherently catalytic at the point of loading. Specifically, in the absence of other catalytic species the material typically has no catalytic effect. In other words, it typically does not catalyse reactions with species contained in the emission to be treated such as, for example, unburnt hydrocarbons, carbon monoxide, carbon dioxide, nitrogen-containing specifies, soot, metals etc. Of course the synthetic ash may provide at least a partial catalytic effect when combined with other species loaded onto the filter, for example a catalytic washcoat. However, the synthetic ash is typically not capable of providing a catalytic effect on its own under the typical operating conditions of the filter.

However, certain preferred synthetic ash components, e.g. ceria or ceria-zirconia mixed oxides do possess at least catalytic activity for surface-to-surface contact soot combustion. Nevertheless, the definitions in the preceding paragraph are intended inter alia to distinguish the synthetic ash from those generated through the use of fuel borne catalyst (FBC) formulations, wherein certain metallo-organic compounds containing metallic napthenates etc. or colloidal dispersions of very fine metallic oxide particles of one or more of e.g. Cu, Fe, Pt or Ce to the engine fuel. During the combustion process, the catalysts are incorporated in the soot matrix and then collected on the filter. This approach can improve the solid catalyst-soot contact with the $O_2$ and can reduce the temperature for dry soot combustion (see R. M. Heck et al, Catalytic Air Pollution Control—Commercial Technology, $3^{rd}$ Edition (2009), pp. 259-260 and 273; and "Filters Using Fuel Borne Catalysts", Paul Richards, Revision 2014.12, DieselNet Technology Guide (available to subscribers at https://www.dieselnet.com/tech/dpf_fbc.php).

Filters containing catalyst derived from FBC can also be distinguished in that the filter of the present invention in its fresh state, i.e. as manufactured e.g. uncanned, contains no FBC-derived catalyst components. They can also be distinguished in that the FBC is present within the structure of the soot particles, i.e. in intimate combination therewith, whereas the synthetic ash of the present invention contacts soot only by surface-to-surface contact between the soot particles and the synthetic ash.

The synthetic ash is preferably devoid of platinum group metal-containing catalytic material. This may reduce the cost of the raw materials of the particulate filter. The platinum group metals include: platinum, palladium, ruthenium, rhodium, osmium and iridium.

The synthetic ash typically does not react with the material of the filter (e.g. cordierite, silicon carbide etc.) at typical operating temperatures of the filter, for example up to 300° C., or up to 500° C., or up to 700° C., or even up to 800° C. The synthetic ash also typically does not react at such temperatures with other species that may be contained in the filter, for example a catalytic washcoat (e.g. catalytic washcoats comprising conventional "three-way catalysts", TWCs).

The synthetic ash is not formed directly by a combustion process. For example, the synthetic ash is not a component of an emission to be treated by the emission treatment system, e.g. a product of the combustion of a fuel such as gasoline.

The synthetic ash may contain one or more species that are present in a non-synthetic ash. The synthetic ash is typically substantially free of carbonaceous species, for example soot.

At least the inlet side of the particulate filter is loaded with synthetic ash. Synthetic ash may be also loaded on the outlet side of the filter and/or in the interior of the filter. The loading may be characterised as "on wall" loading or "in wall" loading. The former is characterised by the formation of a synthetic ash on a surface of the filter. The latter is characterised by the infiltration of synthetic ash into the pores within the porous material. Typically, substantially all of the synthetic ash is loaded "on-wall". In contrast, when a catalyst, such as a three-way catalyst (TWC), is also present, typically substantially all of the catalyst is loaded "in wall". The loading a synthetic ash "on wall" may be achieved, for example, by modifying the rheological characteristics of a washcoat slurry in which the synthetic ash is applied.

The synthetic ash may be loaded in the form of a packed bed, for example when the synthetic ash is loaded by being "blown" into the particulate filter. Such a packed bed is typically porous and typically gas-permeable. Alternatively, the synthetic ash may be in the form of a porous coating, e.g. a coating applied as (i.e. derived from) a washcoat slurry.

It is surprisingly found that when incorporated into an emission treatment system of a gasoline engine, the particulate filter exhibits a combination of high fresh filtration efficiency and a reduced increase in backpressure over time. Without being bound by theory, it is considered that the synthetic ash functions in a similar manner to a soot cake formed after a large driving distance, for example after 5000 km, or after 10000 km, or 20000 km (the soot cake formed after a certain distance of driving will, of course, depend on, inter alia, the fuel used, the gasoline engine, and the driving conditions). In other words, the synthetic ash serves to trap particulate matter contained in the emission, thereby providing a high filtration efficiency. Advantageously, this high filtration efficiency is exhibited by the particulate filter fresh off the production line, meaning that the particulate filter is better able to pass an end-of-line performance test at an OEM.

As discussed above, in conventional gasoline particulate filters a high fresh filtration efficiency is typically provided by the use of high washcoat loading levels. Since the particulate filter of the present invention may provide a high fresh filtration efficiency without the need to use a high washcoat loading level, the increase in back pressure of the filter over time may be reduced. Furthermore, since less washcoat is required, the raw material costs of the particulate filter may be reduced.

Since the ash is "synthetic", its composition may be controlled to be substantially devoid of species capable of reacting with the material of the particulate filter or with a catalyst composition loaded onto the filter. This is in contrast to conventional accumulated ash, e.g. from engine oil lubricants or fuel borne additives—as also discussed hereinabove—and/or soot cake, which typically contain species capable of poisoning conventional catalysts used in gasoline emission systems. Accordingly, when the particulate filter is loaded with a catalyst, the particulate filter may provide the combination of high filtration efficiency and reduced increase in back pressure over time together with high catalytic performance. Since the ash is "synthetic", it is possible to control its position in the filter, loading level and particle size to thereby fine tune the fresh filtration and back pressure characteristics of the filter.

The synthetic ash preferably comprises one or more of: aluminium oxide, zinc oxide, zinc carbonate, calcium oxide, calcium carbonate, cerium zirconium (mixed) oxide, zirconium oxide, cerium oxide and hydrated alumina, more preferably one or more of: zinc oxide, zinc carbonate, calcium oxide, calcium carbonate and zirconium oxide. At conventional operation temperatures, such species typically do not react with the materials of which conventional gasoline particulate filters are made. At conventional operation temperatures, such species typically do not react with catalysts typically loaded onto gasoline particulate filters, for example a TWC. Furthermore, unlike a soot cake, the synthetic ash does not "burn off" during normal operation. Accordingly, the filtration efficiency of the particulate filter is typically substantially constant throughout the lifetime of the particulate filter. In the case of a synthetic ash comprising hydrated alumina, the hydrated alumina typically transforms into alumina in situ, i.e. under the operating conditions of the particulate filter. In order to provide a particulate filter in which the synthetic ash comprises hydrated alumina, any calcining step would need to be carried out prior to the loading of the hydrated alumina. In a preferred embodiment, the synthetic ash is free of aluminium oxide and/or cerium zirconium oxide and/or cerium oxide.

The synthetic ash is preferably devoid of catalyst-poisoning materials. When the particulate filter is loaded with a catalyst composition such as, for example, a TWC composition, this may serve to avoid any significant decrease in the catalytic performance of the particulate filter.

In this regard, the synthetic ash is preferably substantially free of sulphur oxides, phosphorus, magnesium, manganese, and lead. Such species are known to poison catalysts typically used in gasoline particulate filters.

The filter preferably comprises from 1 to 50 g/L of the synthetic ash, more preferably from 5 to 40 g/L, even more preferably from 10 to 35 g/L, still even more preferably from 15 to 35 g/L, yet still even more preferably from 20 to 30 g/L. Lower levels of synthetic ash may not provide an adequate fresh filtration efficiency. Higher levels may increase production costs, and may also increase the back pressure of the filter in use.

The filter preferably comprises a porous body comprising a plurality of pores, and further comprises one or more catalytic washcoats within at least a portion of the plurality of pores. The use of one of more catalytic washcoats may serve to treat components of a gasoline exhaust gas such as, for example, unburnt hydrocarbons, carbon monoxide and/or nitrogen oxide. In comparison to conventional gasoline particulate filters, the particulate filter of the present invention may contain lower levels of washcoat (e.g. a TWC washcoat), for example less than 1 $g/in^3$, or less than 0.7 $g/in^3$, or less than 0.5 $g/in^3$, or less than 0.3 $g/in^3$, or from 0.05 to 0.9 $g/in^3$, or from 0.1 to 0.6 $g/in^3$. This is because there is no need to rely on high washcoat loadings in order to achieve high fresh filtration efficiency. In order to provide sufficient catalytic activity to oxidize carbon monoxide and hydrocarbons, as well as reduce nitrogen oxides ($NO_x$), the washcoat (e.g. TWC washcoat) is preferably present in an amount of 0.05 $g/in^3$ or more, or 0.1 $g/in^3$ or more. The catalytic washcoat is typically distributed substantially throughout the plurality of pores.

The one or more washcoats preferably include a TWC washcoat. Such washcoats are known in the art and are particularly effective in emission treatment systems of gasoline engines.

In one embodiment, the particulate filter is canned. In an alternative embodiment, the filter is uncanned. Being "canned" means that the particulate filter has been incorporated into a housing for incorporation into an emission treatment system. Being "uncanned" means that the particulate filter has not yet been incorporated into a housing for incorporation into an emission treatment system, but is still loaded with the synthetic ash. In a typical canning process, the particulate filter is sleeved in a support mat, typically formed of ceramic fibres or alumina fibres, before being incorporated into a metal housing. Methods of incorporating the particulate filter into a metal housing include, for example, "clam-shell", "stuffing and "tourniquet" techniques. Such techniques are known in the art.

In a further aspect there is provided an emission treatment system comprising the particulate filter described herein, wherein the inlet side of the particulate filter is arranged to be upstream of the outlet side. The inlet side being arranged to be upstream of the outlet side means that emissions from the gasoline engine enter the particulate filter via the inlet side before exiting the filter via the outlet side. The particulate filter is typically canned prior to being incorporated into the emission treatment system.

In a further aspect there is provided a method of producing a particulate filter for use in an emission treatment system of a gasoline engine, the method comprising:
    providing a filter having an inlet side and an outlet side; and
    loading at least the inlet side with a synthetic ash.

The particulate filter produced according to the method may be the particulate filter as described herein. That is, all features of the first aspect may be freely combined with the further aspects described herein.

The synthetic ash may be contacted with the inlet side in the form of a gaseous suspension. Alternatively, the synthetic ash may be contacted with the inlet side in the form of a liquid suspension, e.g. a washcoat.

Preferably, the synthetic ash is "dry loaded", i.e. loaded without the use of a liquid carrier. Such dry loading may result in the distribution of the synthetic ash within the filter more closely mimicking the distribution of non-synthetic ash that becomes loaded onto a particulate filter during use. Accordingly, the fresh filtration efficiency of the filter may more closely mimic the filtration efficiency of the filter that is experienced after a large distance of driving.

Once loaded, the synthetic ash may take the form of a packed bed. For example, when the particulate filter is a wall flow filter, the synthetic ash may form a packed bed against the walls of the plurality of channels open at the inlet side. The packed bed may be formed in the channels open at the inlet side and against the sealant material closing the channels, i.e. towards the outlet end of the inlet channels. The packed bed is typically porous and is typically gas permeable, the pores being sized to trap particulate matter in a gasoline exhaust, for example soot. The pores of the packed bed are typically smaller than the pores of the porous substrate of the particulate filter. Alternatively, or in addition, the packed bed may be more porous than the walls of the porous substrate (i.e. it may provide a high level of filtration by the provision of a long path length). The packed bed may extend along the walls of the plurality of channels open at the inlet side. The packed bed may take the form of a layer or membrane, for example a continuous layer or membrane. The packed bed may extend along the entire length of the walls of the plurality of channels, or along only part of the length of the walls. Instead of being a packed bed, the synthetic ash may be in the form of a porous coating, e.g. a coating applied as (i.e. derived from) a washcoat slurry. The porous coating may be arranged in a wall flow filter in a similar manner to the packed bed discussed above.

The method may further comprise canning the synthetic ash-loaded filter. Techniques for canning the synthetic ash-loaded filter are known in the art and examples of such techniques are referred to above.

The synthetic ash may be loaded in the form of a particulate. The particulate may have a D90 of, for example, less than 10 μm, or less than 5 μm, although other particle size distributions may be employed. The synthetic ash is preferably loaded in the form of a particulate having a D90 of less than 1 μm. Such particle distributions may help to prevent a significant amount of the synthetic ash from entering the pores of the porous substrate. For the avoidance of doubt, the D90 measurements were obtained by Laser Diffraction Particle Size Analysis using a Malvern Mastersizer 2000, which is a volume-based technique (i.e. D90 may also be referred to as $D_v90$ (or $D(v,0.90)$)) and applies a mathematical Mie theory model to determine a particle size distribution. Samples of synthetic ash for D90 measurements were prepared by sonication in distilled water without surfactant for 30 seconds at 35 watts.

In a preferred embodiment, loading at least the inlet side with the synthetic ash comprises:
  contacting the inlet side with the synthetic ash; and
  providing a gaseous flow from the inlet side to the outlet side and/or a vacuum from the outlet side to compact the synthetic ash against the filter.

The inlet side is preferably contacted with the synthetic ash in the form of either a gaseous suspension (i.e. by blowing synthetic ash towards the inlet side) or a liquid suspension (e.g. a washcoat).

The method may further comprise calcining the loaded synthetic ash. Calcining may reduce the back pressure of the resulting particulate filter.

In a further aspect the present invention provides use of a synthetic ash loading to increase the fresh filtration efficiency of a filter for use in an emission treatment system for a gasoline engine.

BRIEF DESCRIPTION OF THE DRAWINGS

The invention will now be described in relation to the following non-limiting figures, in which.

DETAILED DESCRIPTION OF THE INVENTION

Figure 1A:
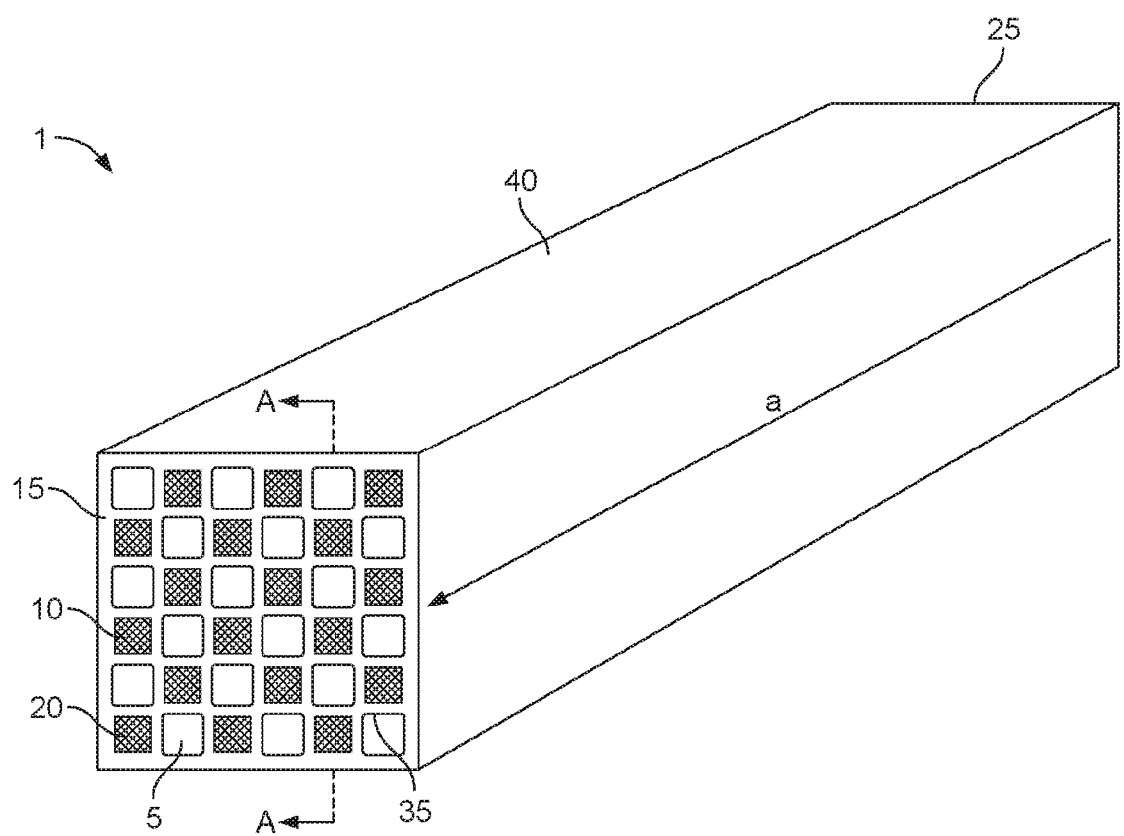
FIG. 1A is a perspective view that schematically shows a particulate filter 1 according to an embodiment of the present invention.
Figure 1B:
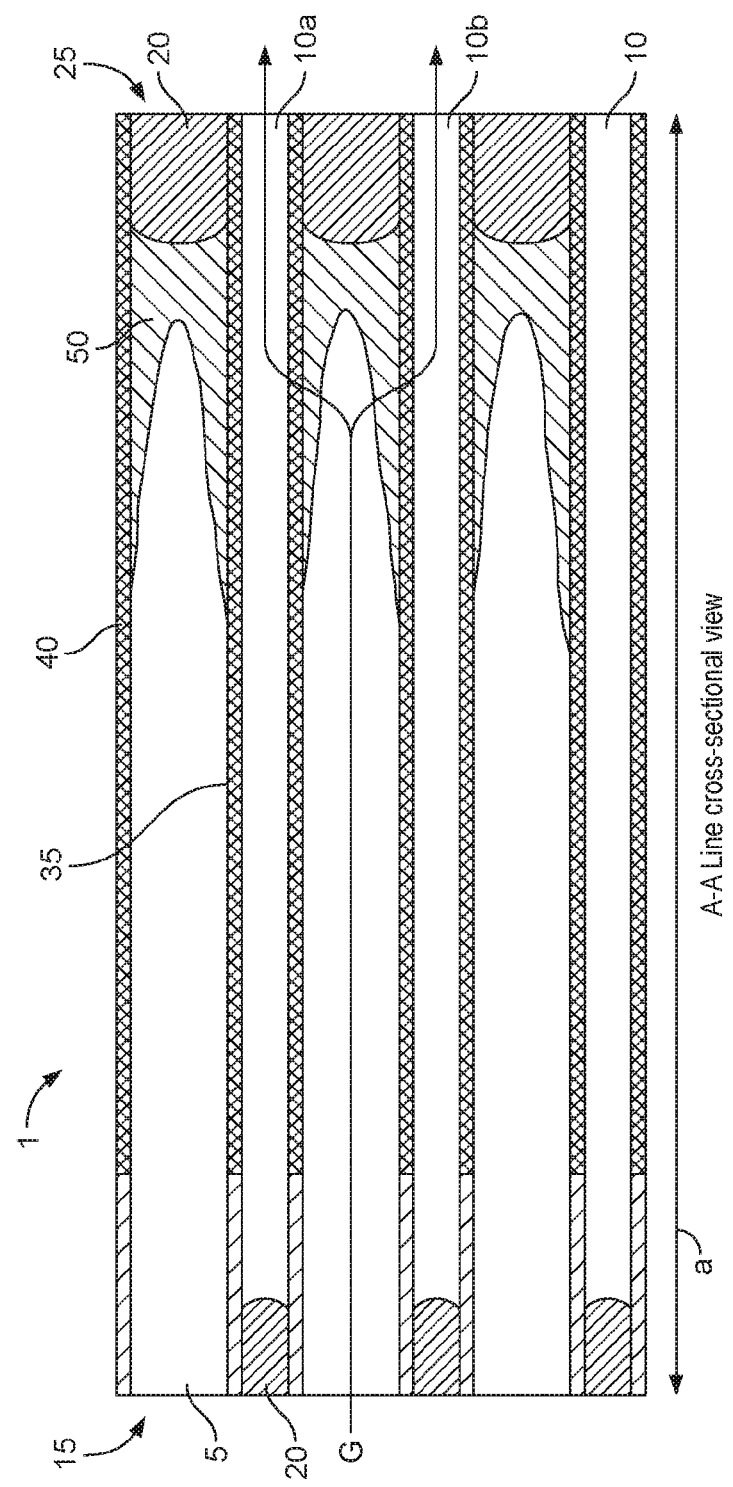
FIG. 1B is an A-A line cross-sectional view of the particulate filter 1 shown in FIG. 1A.

A particulate filter 1 according to an embodiment of the present invention is shown in FIG. 1A and FIG. 1B. In this embodiment, the particulate filter is a wall flow filter. It includes a large number of channels arranged in parallel with each other in the longitudinal direction (shown by a double-sided arrow "a" in FIG. 1A) of the filter 1. The large number of channels includes a first subset of channels 5 and a second subset of channels 10.

The channels are depicted such that the second subset of channels 10 is narrower than the first subset of channels 5. However, the channels may alternatively be substantially the same size.

The first subset of channels 5 is open at an end portion on a first end face 15 of the wall flow monolith 1 and is sealed with a sealing material 20 at an end portion on a second end face 25.

On the other hand, the second subset of channels 10 is open at an end portion on the second end face 25 of the wall flow monolith 1 and is sealed with a sealing material 20 at an end portion on the first end face 15.

The filter 1 may be provided with a catalytic material within pores of the channels walls 35. The catalyst supported in the channel wall 35 of the monolith 1 functions as a catalyst for treating the exhaust fumes.

Synthetic ash 50 is situated within the first subset of channels 5 and is packed against the sealing material 20 at the end portion on the second face 25. The packed bed of synthetic ash extends from the sealing material along the channel walls 35.

Therefore, when the particulate filter is used in an exhaust system, exhaust gases G (in FIG. 1B "G" indicates exhaust gases and the arrow indicates a flowing direction of exhaust gases) introduced to the first subset of channels 5 will pass through the synthetic ash 50 and the channel wall 35 interposed between the channel 5a and the channels 10a and 10b, and then flow out from the monolith 1. Accordingly, particulate matter in exhaust gases is captured by the synthetic ash 50.

Figure 2:
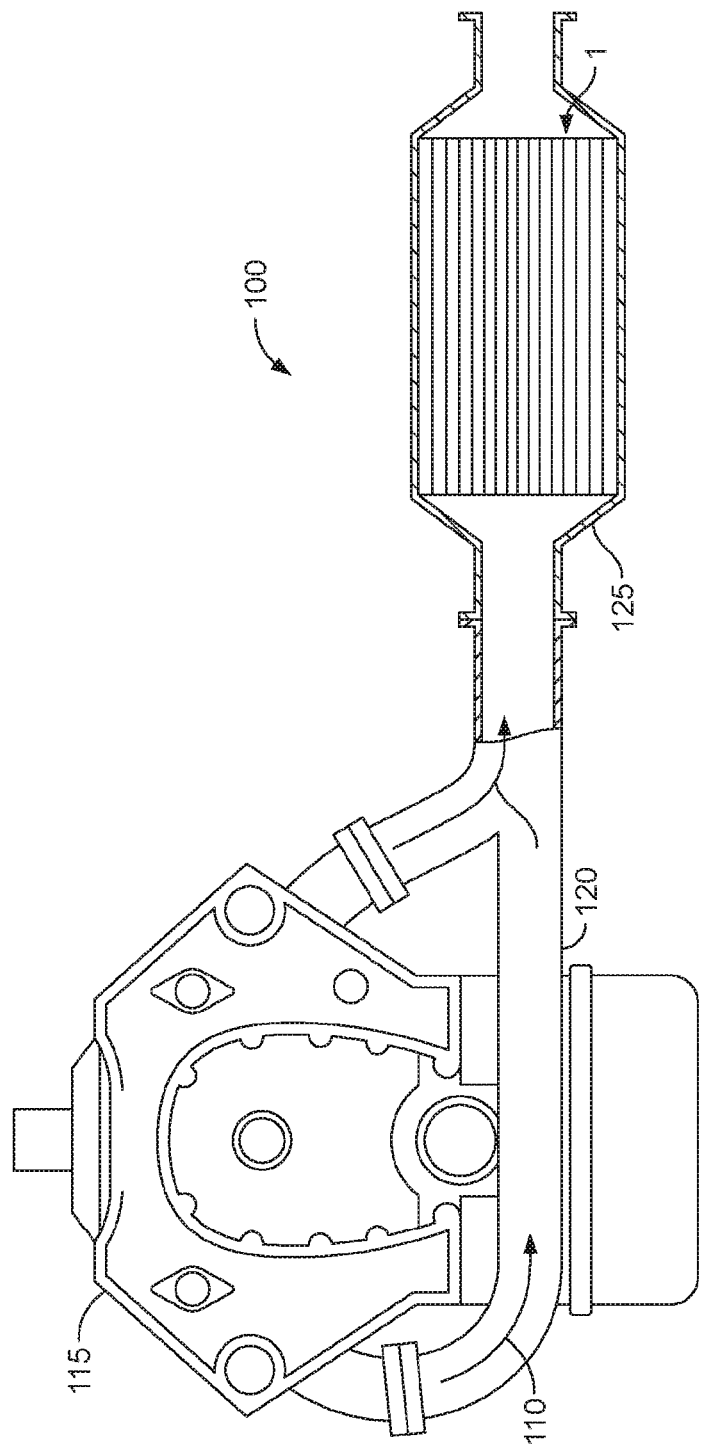
FIG. 2 shows a schematic diagram of an emission treatment system for a gasoline engine.

In the embodiment of the emission treatment system 100 shown in FIG. 2 the flow of exhaust gas 110 passes through the particulate filter 1. The exhaust gas 110 is passed from the gasoline engine 115 through ducting 120 to the exhaust system 125.

It should be noted that the particulate filter is described herein as a single component. Nonetheless, when forming an emission treatment system, the filter used may be formed by adhering together a plurality of channels or by adhering together a plurality of smaller filters as described herein. Such techniques are well known in the art, as well as suitable casings and configurations of the emission treatment system.

The catalytic wall-flow monolith will now be described further in relation to the following non-limiting example.

Example 1

Filter I: a particulate filter was prepared by loading ZnO powder into the inlet side of a commercial 300/8 65% porosity uncoated cordierite wall flow filter. The ZnO power was placed onto a supporting mesh above the inlet of the filter to be coated and an air stream was directed from the inlet side through the wall flow filter and out of the outlet side, thereby drawing the ZnO power through the mesh and into the filter, compacting the ZnO powder against the sealing plugs of the inlet channels. Approximately 45 g of ZnO powder was loaded onto the filter, providing a loading level of approximately 25 g/L.

Filter II: a second particulate filter was prepared in a similar manner as in Filter I, but with Disperal® powder (a high purity dispersible alumina hydrate) used instead of ZnO.

Filter III (Comparative): another particulate filter was prepared by coating a commercial 300/8 65% porosity uncoated cordierite wall flow filter with TWC washcoat (0.4 g/in$^3$ washcoat loading, 30 g/ft$^3$ PGM, (0:27:3, Pt/Pd/Rh)) from the inlet and outlet side.

Filter IV: another particulate filter was prepared first as in Filter III, by coating a commercial 300/8 65% porosity uncoated cordierite wall flow filter with TWC washcoat (0.4 g/in$^3$ washcoat loading, 30 g/ft$^3$ PGM (0:27:3, Pt/Pd/Rh)) from the inlet and outlet side and calcining at 500° C. before 45 g of Disperal® powder was loaded into the inlet side of the coated filter, prepared in a similar manner as in Filters I and II.

Figure 3:
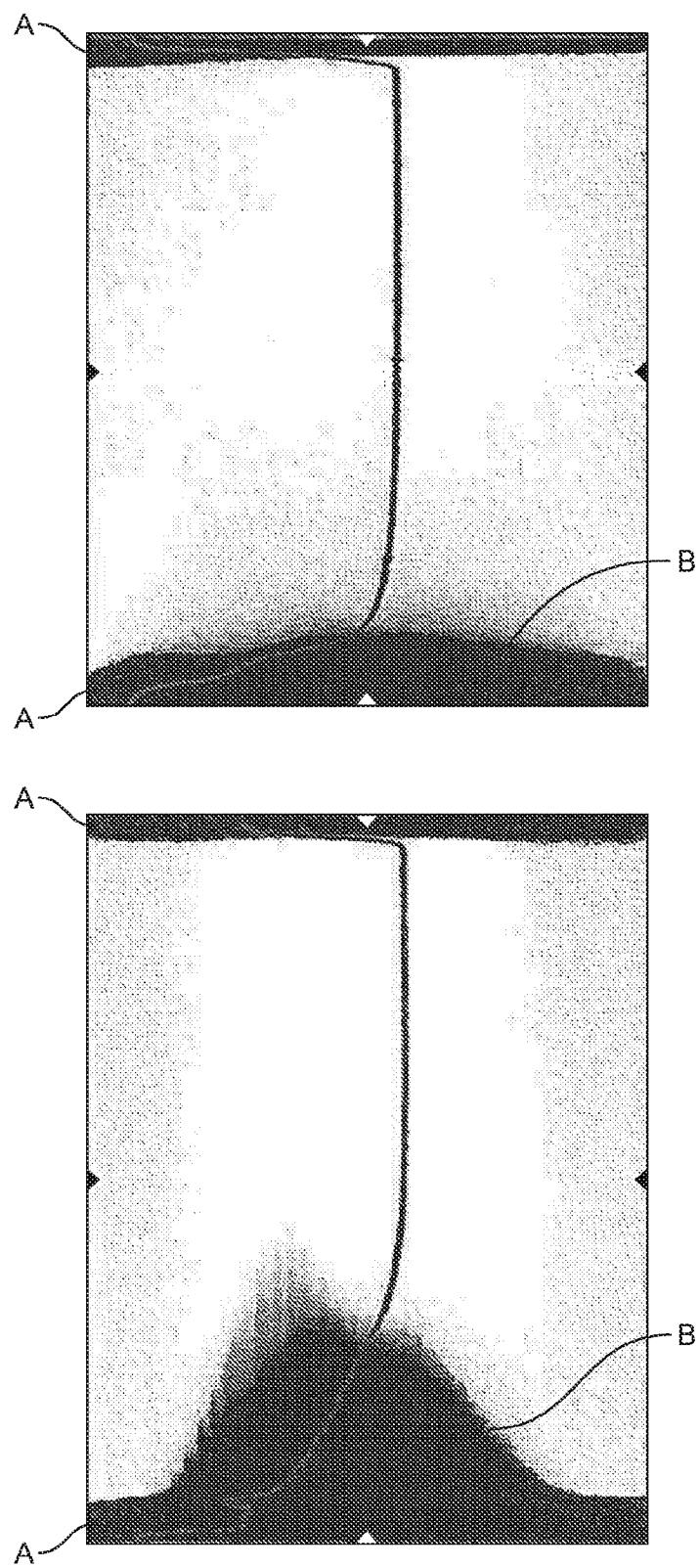
FIG. 3 shows X-ray images of particulate filters according to embodiments of the present invention.

X-ray images of Filters I and II are shown in FIG. 3 [top: Filter II (Disperal®); bottom: Filter I (ZnO)], with the inlet sides being at the top of the images. The dark bands indicate the plugs A at the top and bottom of the filters. Additional dark shading at the bottom of the filters corresponds to synthetic ash B compacted against the end plugs of the channels.

Figure 4:
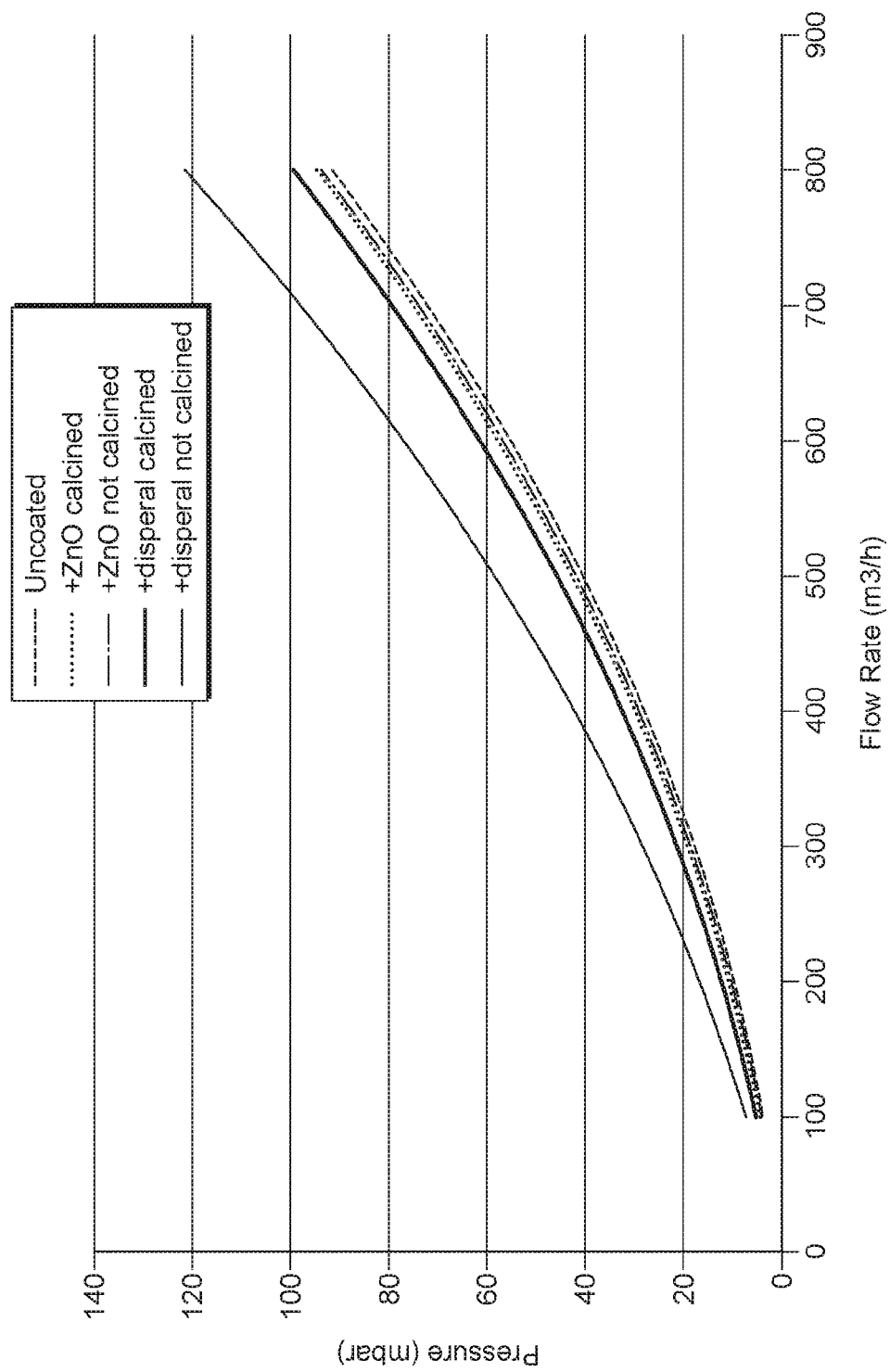
FIG. 4 shows a plot of backpressure characteristics of particulate filters according to embodiments of the present invention and a prior art particulate filter.

Back pressure characteristics of the particulate filters were investigated, both before and after calcining at 500° C., and the results are shown in FIG. 4 together with the results of a wall flow filter containing no synthetic ash (curves from top to bottom: Disperal®, not calcined (Filter II); Disperal®, calcined (Filter IIC); ZnO, not calcined (Filter I); ZnO-calcined (Filter IC); and uncoated (dashed)). It can be seen that the filters loaded with synthetic ash, particularly after calcining, exhibited similar back pressure characteristics to a filter in which no synthetic ash had been loaded.

Figure 5:
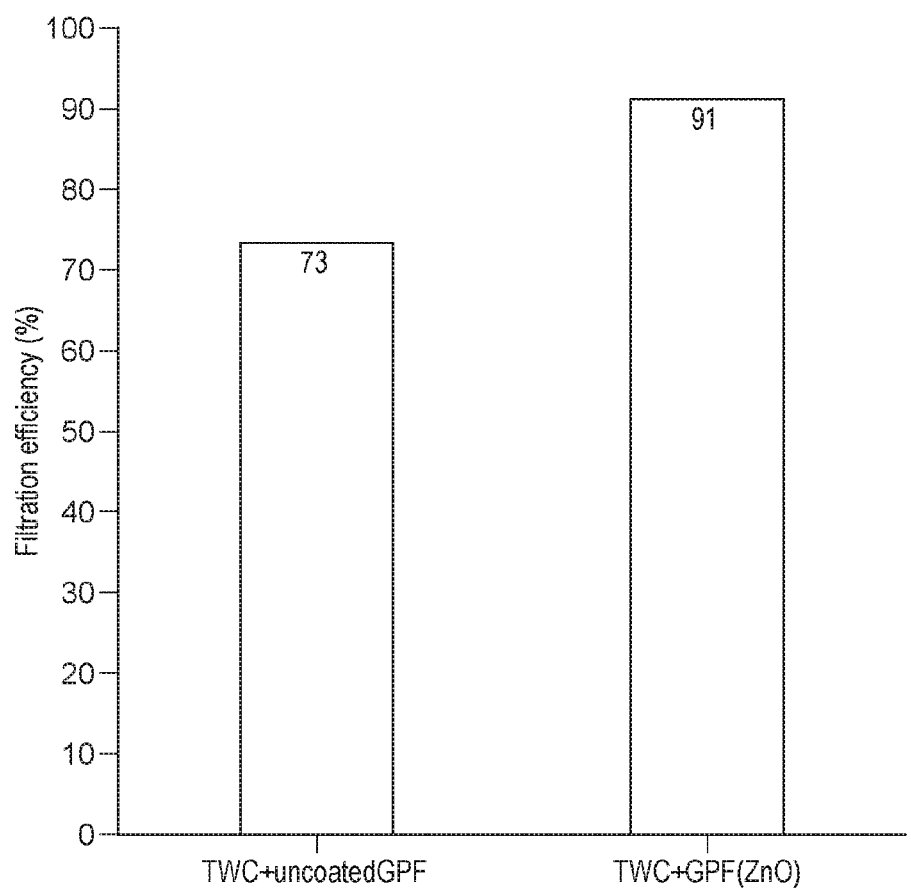
FIG. 5 shows a plot of filtration efficiencies of a particulate filter according to an embodiment of the present invention and a prior art particulate filter.

The fresh filtration efficiencies of Filter I and an uncoated particulate filter in which no synthetic ash was loaded were measured with a TWC in the first position (1 L volume substrate with 400/4 CPSI and a catalyst coating with 21 g/ft$^3$ (0:18:3. Pt/Pd/Rh) (Euro 5 compliant 2 L gasoline direct injection engine; NEDC testing; PN engine out=1.28× 10$^{12}$), and the results are shown in FIG. 5. It can be seen that the fresh filtration efficiency of the ZnO-loaded particulate filter (right hand side) was 91%, whereas the particulate filter without synthetic ash exhibited a fresh filtration efficiency of 73%. The results indicate that the particulate filter of the present invention provides an advantageous combination of high fresh filtration and low back pressure.

Figure 6:
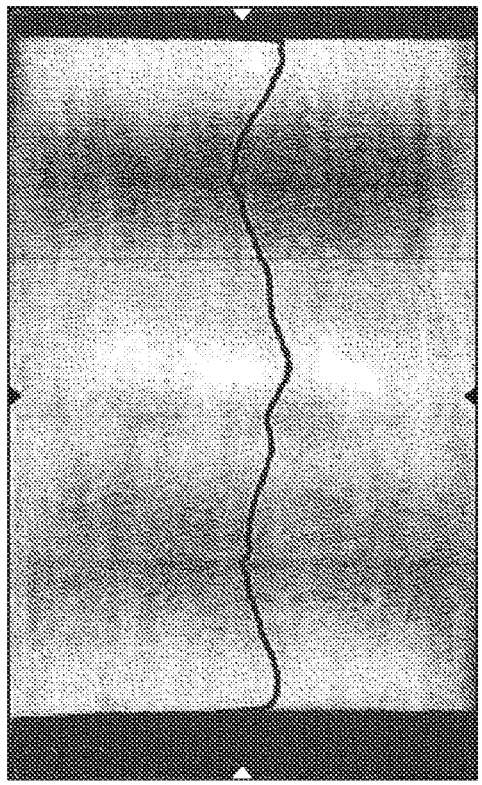
FIG. 6 shows X-ray images of particulate filters: Comparative Filter III and Filter IV according to an embodiment of the present invention.
Figure 6:
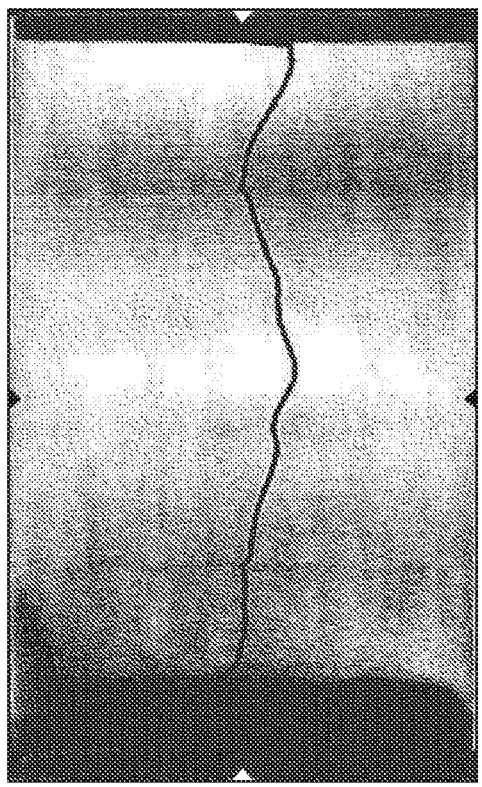

Similar to FIG. 3, X-ray images of Filters III and IV are shown in FIG. 6 (top: Comparative Filter III; bottom: Filter IV), with the inlet sides being at the top of the images.

Although preferred embodiments of the invention have been described herein in detail, it will be understood by those skilled in the art that variations may be made thereto without departing from the scope of the invention or of the appended claims.

For the avoidance of doubt, the entire contents of all documents cited herein are incorporated herein by reference.

The invention claimed is:

1. A particulate filter for use in an emission treatment system of a gasoline engine, the filter having an inlet side and an outlet side, wherein at least the inlet side is loaded with a synthetic ash: wherein the synthetic ash comprises one or more of: aluminum oxide, zinc oxide, zinc carbonate, calcium oxide, calcium carbonate, cerium zirconium (mixed) oxide, zirconium oxide, cerium oxide and hydrated alumina; and where the synthetic ash is free of sulphur oxides, phosphorus, magnesium, manganese, and lead.

2. The particulate filter of claim 1, wherein the particulate filter is a wall-flow filter.

3. The particulate filter of claim 1, wherein the synthetic ash comprises one or more of zinc oxide, zinc carbonate, calcium oxide, calcium carbonate and zirconium oxide.

4. The particulate filter of claim 1, wherein the synthetic ash is devoid of platinum group metal-containing catalytic material.

5. The particulate filter of claim 1, wherein the filter comprises from 20 to 30 g/L.

6. The particulate filter of claim 1, wherein the filter comprises a porous body comprising a plurality of pores, and further comprising one or more catalytic washcoats within at least a portion of the plurality of pores, wherein the one or more washcoats include a TWC washcoat.

7. The particulate filter of claim 1, wherein the particulate filter is uncanned.

8. An emission treatment system comprising the particulate filter of claim 1, wherein the inlet side of the particulate filter is arranged to be upstream of the outlet side.

9. A method of producing a particulate filter for use in an emission treatment system of a gasoline engine, the method comprising:
providing a filter having an inlet side and an outlet side; and
loading at least the inlet side with a synthetic ash,
wherein the synthetic ash comprises one or more of: aluminium oxide, zinc oxide, zinc carbonate, calcium oxide, calcium carbonate, cerium zirconium (mixed oxide, zirconium oxide, cerium oxide and hydrated alumina; and
wherein the synthetic ash is free of sulphur oxides, phosphorus, magnesium manganese and lead.

10. The method according to claim 9, wherein the method further comprises canning the synthetic ash-loaded filter.

11. The method according to claim 9, wherein the synthetic ash is loaded in the form of a particulate having a D90 of less than 1 μm.

12. The method according to claim 9, wherein loading at least the inlet side with the synthetic ash comprises:
contacting the inlet side with the synthetic ash; and
providing a gaseous flow from the inlet side to the outlet side and/or a vacuum from the outlet side to compact the synthetic ash against the filter.

13. The method of claim 12, wherein the inlet side is contacted with the synthetic ash in the form of either a gaseous suspension or a liquid suspension.

14. The method of claim 9, further comprising calcining the loaded synthetic ash.

* * * * *